US006371327B1

(12) United States Patent
Swiontek et al.

(10) Patent No.: US 6,371,327 B1
(45) Date of Patent: Apr. 16, 2002

(54) COMPARTMENTED DISPOSABLE FOOD SERVICE ARTICLES WITH ANGULAR JUNCTIONS THERMOFORMED WITH PLUG-ASSIST

(75) Inventors: Anthony J. Swiontek, Neenah; Mark B. Littlejohn, Appleton, both of WI (US); Wayne W. Lamson, Beaverton, MI (US)

(73) Assignee: Fort James Corporation, Deerfield, IL (US)

( * ) Notice: Subject to any disclaimer, the term of this patent is extended or adjusted under 35 U.S.C. 154(b) by 0 days.

(21) Appl. No.: 09/653,575

(22) Filed: Aug. 31, 2000

Related U.S. Application Data

(60) Provisional application No. 60/153,097, filed on Sep. 9, 1999.

(51) Int. Cl.[7] ............................................... B29C 51/06
(52) U.S. Cl. ....................... 220/574; 220/575; 425/384; 425/388; 264/549
(58) Field of Search ................................ 220/575, 574; 264/549; 425/388, 384

(56) References Cited

U.S. PATENT DOCUMENTS

| | | | | |
|---|---|---|---|---|
| 2,719,413 A | * | 10/1955 | Panzor ........................ 220/575 |
| 3,811,594 A | * | 5/1974 | Paulucci ..................... 220/575 |
| 4,420,454 A | | 12/1983 | Kawaguchi et al. | |
| 4,536,148 A | * | 8/1985 | Murley et al. ............... 425/384 |
| 4,636,349 A | * | 1/1987 | MacLaughlin ............... 204/549 |
| 4,668,175 A | * | 5/1987 | Martin ........................ 425/388 |
| 4,690,666 A | | 9/1987 | Alexander et al. | |
| 5,149,584 A | | 9/1992 | Bater et al. .................. 428/297 |
| 5,413,866 A | | 5/1995 | Baker et al. ............. 423/447.2 |
| 5,458,784 A | | 10/1995 | Baker et al. ................. 210/674 |
| 5,618,875 A | | 4/1997 | Baker et al. ................. 435/335 |
| 5,641,524 A | | 6/1997 | Rush et al. .................. 425/384 |
| 5,653,951 A | | 8/1997 | Rodriguez et al. .......... 423/439 |
| 6,047,845 A | * | 4/2000 | Rapaz ......................... 220/575 |

FOREIGN PATENT DOCUMENTS

| | | | |
|---|---|---|---|
| DE | 1 704 405 | 7/1971 | |
| DE | 296 05 250 U1 | 8/1997 | ........... B29C/51/30 |
| EP | 0 897 948 A1 | 2/1999 | |
| JP | 4-201234 | 7/1992 | ........... B29C/59/02 |
| JP | 11-315458 | 11/1999 | ............ D04H/1/54 |

* cited by examiner

Primary Examiner—Joseph M. Moy
(74) Attorney, Agent, or Firm—Michael W. Ferrell

(57) ABSTRACT

Compartmented food service articles with sharp angular junctions are thermoformed utilizing a plug-assisted thermoforming process. The plug is employed in connection with a thermoforming mold having a plurality of rib portions which project axially from a substantially planar mold surface of the thermoforming mold, and which rib portions define a plurality of angular junctions with the substantially planar mold surface. The plug includes a plurality of rib relief portions positioned and configured to fit about the rib portions of the mold in a forming operation at an axial clearance distance of about 0.125 inches or less from the angular junction of the rib portions of the mold with the substantially planar mold surface. The plug is also provided with a plurality of substantially vertical wall rib relief portions configured and dimensioned to be substantially vertically aligned with said angular junctions of the rib portions of the mold with the substantially planar mold surface, the vertical wall portions being adjacent a plurality of angular corner portions transitioning between the vertical wall rib relief portions of the plug and a bottom surface thereof.

39 Claims, 7 Drawing Sheets

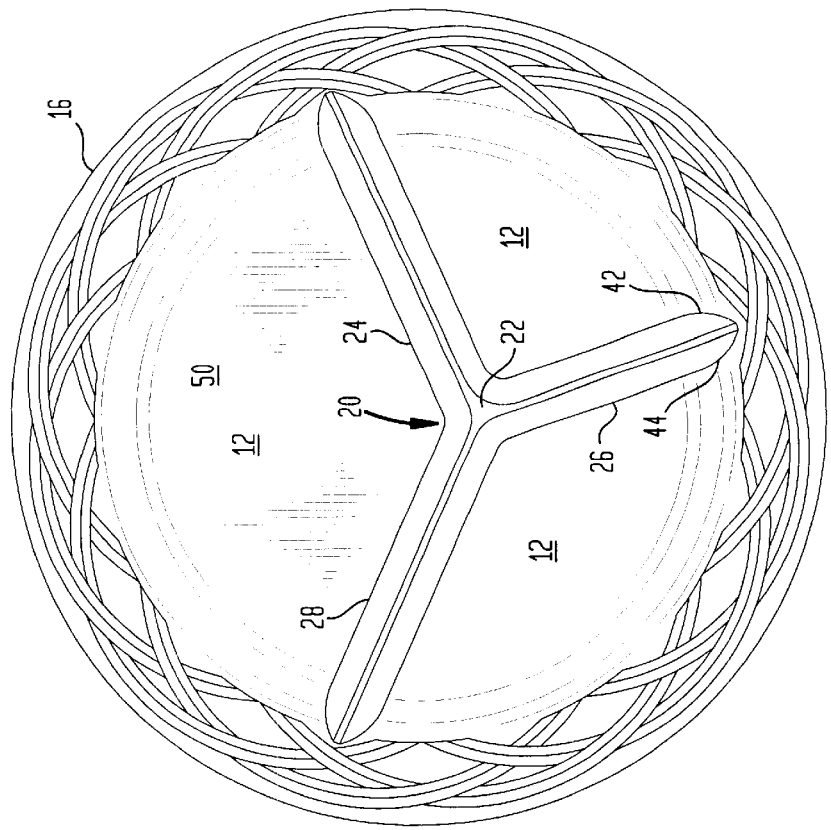
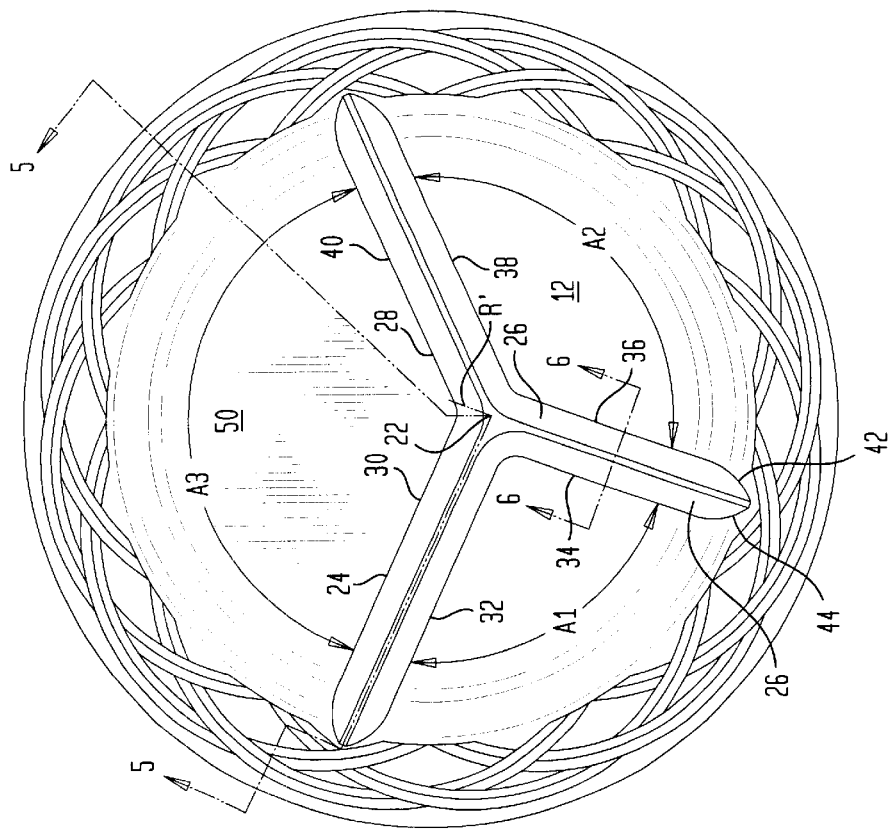
FIG. 3
FIG. 4

COMPARTMENTED DISPOSABLE FOOD SERVICE ARTICLES WITH ANGULAR JUNCTIONS THERMOFORMED WITH PLUG-ASSIST

This application claims the benefit of U.S. Provisional Application No. 60/153,097, filed Sep. 9, 1999.

TECHNICAL FIELD

The present invention relates generally to disposable food service articles and more particularly to compartmented food service articles thermoformed from plastic sheet by way of plug-assist thermoforming.

BACKGROUND

Plug-assist thermoforming is often desirable, especially to aid in the redistribution of material into a mold. Typically, a mechanically driven plug is used to prestretch the plastic sheet into a female mold cavity or around mold features. Vacuum and/or pressure is then applied to pull and/or push the sheet against the mold surface where it is cooled to set the shape. The heat softened plastic sheet can either be formed up (plug on bottom/mold on top) or formed down (plug on top/mold on bottom). Numerous other variations of plug-assisted thermoforming are also possible as discussed by Professor Throne. A detailed discussion of plug-assist thermoforming is set forth in a book entitled *Thermoforming* by James L. Throne (1987).

As noted on pg. 207 of *Thermoforming:* "The plug design parameters include the shape of the plug tip, the plug penetration depth (relative to the cavity depth) and the plug diameter (relative to the cavity diameter). The plug surface temperature and coefficient of friction (between the plug surface and the stretching sheet) are also considered design factors."

Plugs can be produced from wood, syntactic foam, aluminum, etc. Plugs are frequently heated or cooled. Syntactic foam plugs typically are not heated or cooled since they are insulators. Syntactic foam is commonly used since it is easily machined and does not instantaneously chill the plastic sheet upon contact. Plugs may be designed with a hollow center bottom so they do not cool the bottom material and can more easily redistribute the material towards the corners where sheet thinning will often occur. Internal mold corners and edges will typically be substantially thinner than the original plastic sheet thickness from the sheet stretching process as detailed in chapters 4 and 7 of *Thermoforming*.

In order to overcome the problems of sheet thinning and to assist the formation of shaped articles, a variety of plug-assist techniques have been employed. See, for example, U.S. Pat. No. 5,641,524 of Rush et al. where an apparatus useful for thermoforming a disposable cup is illustrated.

Some compartmented plastic articles can be produced without any plug-assist. Large generous internal corners and edges, gentling sloping side angles and shallow depths are often features designed into the products to minimize sheet thinning. Higher caliper sheet can also be used to compensate for sheet thinning. This increases the cost for the disposable plastic products and may not be an acceptable alternative.

Plug-assist forming can be applied to aid in the stretching and material distribution for the compartmented plastic product. One option for a plug design may be an offset of the mold profile and rib geometry (angle, height, etc.) stroked to within 1/8 to 1/4 inch from the mold bottom and/or rib sidewall & top. Another option is to employ a plug with larger external radii between the plug bottom and relieved offset rib profile. Such alternatives do not provide the advantages of the present invention as discussed hereinafter.

SUMMARY OF INVENTION

The plug design of the present invention typically has a near vertical rib relief sidewall (~90 degrees to plug bottom), and a near sharp/small external radii between the plug bottom and near vertically relieved rib sidewall. It was determined through experimentation/prototype production, that this design provided the least amount of rib to plate bottom corner thinning compared to two other plug designs. The preferred compartmented plate design has near sharp rib to bottom & rib to profile junctions where excessive thinning can occur. The excessive thinning may allow food fluids to seep through due to plastic "pinholing".

Specific improvements of the present invention include positioning the near sharp external radii between the plug bottom and vertical relief areas near vertically in-line with the mold rib to bottom & rib to profile near sharp junctions. It is possible to extend the plug along the plate mold sidewall profile to reduce sheet thinning at the transition of the rib to sidewall profile. The bottom portions of the plug may be concave hollowed such as not to contact/cool the sheet and to allow more stretching into the corner near sharp junctions to further reduce bottom thinning.

The plug design of the present invention provides utility for compartmented disposable food serving containers regardless of their shape. The overall container shape could be round, oval, square, rectangular or polyhexal with rounded corners. Containers with any number of compartments with ribbed dividers greater than two can be formed with this plug design. This design is most useful when the rib to bottom & rib to profile junctions are near sharp. Any form of plug-assisted thermoforming can be practiced with the described plug design and positioning technique. The unique plug design allows the use of low caliper, lighter weight plastic sheet to produce containers with near sharp rib edge designs and minimizes the severe corner thinning that often occurs.

Salient features of the plug design which provide the thermoforming and container benefits in particular embodiments are:

1. Near Vertical Rib Relief
2. Near Sharp/Small Radii External Rib Relief Edges
3. Rib Relief Edges Positioned Near Vertically Aligned Above Mold Rib to Bottom and Rib to Profile Junctions
4. Plug Closure to Approximately 1/16" From Product Profile and/or Rib In another aspect of the invention, there is provided compartmented disposable food serving article having a substantially planar bottom portion and a plurality of rib portions configured so as to segment the article into a plurality of food serving compartments, wherein the rib portions are substantially angularly joined to the bottom portion and wherein the food serving article is thermoformed utilizing a plug-assisted thermoforming process. The process includes: positioning a softened plastic sheet to be in close proximity to a thermoforming mold having a substantially planar mold surface and a plurality of rib portions projecting axially from the substantially planar mold surface. Typically, the heat softened plastic sheet is perimeter or individually clamped around the thermoforming mold or molds to create a seal. The rib portions define a plurality of angular junctions with the substantially planar mold surface. The second step of the process is thermoforming the disposable compartmented food service container, wherein a plug-assist member is applied to the softened plastic sheet to urge the sheet toward conformity with the thermoforming mold. The plug-assist member includes a plurality of rib relief portions positioned, configured and dimensioned to fit about the rib portions of the mold in a forming operation at a forming clearance distance of about 0.125 inches or less from the mold. The plug is also provided with a plurality of substantially vertical wall rib relief portions configured and dimensioned to be substantially vertically aligned with the angular junctions of the rib portions of the mold with the substantially planar mold surface. The vertical wall portions are adjacent a plurality of angular corner portions transitioning between the vertical wall rib relief portions of the plug and a bottom surface of the plug.

The compartmented disposable food serving article generally has a wall thickness of from about 10 to about 80 thousandths of an inch ("mils") with a wall thickness of from about 15 to about 25 mils being more typical.

The articles may be formed from a variety of filled or unfilled polymers such as addition polymers or condensation polymers. Polymers employed may be those listed on page 53 of *Thermoforming* noted above, particularly ABS; Acronitrile; Acetate, PMMA; Acrylic/PVC; Butyrate; PC; PET; Polyethersulfone; 20% GR PES; HDPE; Propionate; PP; 40% GR PP; P-Sulfone; P-Styrene; PTFE/FEP; Rigid PVC; Mod. PPO. Vinyl-type thermoplastics, listed on page 41 of *Thermoforming* are frequently preferred, especially: Polyethylene; Polypropylene; Polybutene; Polybutadiene (divinyl); Polyvinyl chloride (PVC); Polyvinyl fluoride (PVF); Polyvinyl dichloride (PVDC); Polyvinylidene fluoride ($PVF_2$); Polytetrafluoroethylene (PTFE); Polystyrene (PS); Polyvinyl Alcohol (PVOH); Polyvinyl Acetate (PVAc); Polymethylmethacrylate (PMMA); Polyacrylonitrile. Particularly preferred plastics useful in connection with the present invention include polystyrene, nylons, polypropylene, acrylic polymers and polyethylene terephthalate ("PET").

Particularly preferred compositions for forming food serving plates, trays, and the like, in accordance with the invention include mineral-filled polypropylene materials.

Particularly preferred articles may have a wall thickness of from about 10 to about 80 mils, typically from 15 to 25 mils, and consist essentially of from about 40 to about 90 percent by weight of a polypropylene polymer, from about 10 to about 60 percent by weight of a mineral filler, from about 1 to about 15 percent by weight polyethylene, from about 0.1 to about 5 weight percent titanium dioxide and may optionally include a basic organic or inorganic compound comprising the reaction product of an alkali metal or alkaline earth element with carbonates, phosphates, carboxylic acids as well as alkali metal and alkaline earth element oxides, hydroxides, or silicates and basic metal oxides, including mixtures of silicon dioxide with one or more of the following oxides: magnesium oxide, calcium oxide, barium oxide, and mixtures thereof. The basic organic or inorganic compound preferably comprises calcium carbonate which is present in an amount of from about 5 to about 20 weight percent. Polyethylene is generally present from about 2.5 to about 15 percent by weight, but more typically present from about 4 to about 5 weight percent. Titanium dioxide may be present from about 0.1 to about 3 weight percent; however titanium dioxide is usually present from about 0.25 to about 2 percent by weight, and titanium dioxide is present in an amount of at least about 0.5 percent by weight in particular embodiments.

A particularly preferred mineral filler is mica and a particularly preferred polypropylene polymer is isotactic polypropylene which has a melt index of from about 0.3 to about 4 and most preferably has a melt flow index of about 1.5. The polyethylene employed in some embodiments may be HDPE or LLDPE.

A particularly preferred article which may be produced in accordance with the present invention is a compartmented food serving plate with an asymmetric rib design described in detail hereinafter. These plates include a substantially planar bottom portion, a sidewall portion extending about the periphery of the bottom portion and projecting upwardly therefrom, a flange portion extending outwardly from the sidewall portion and a divider portion configured so as to segment the plate into three compartments of differing volume. The divider portion has a central junction portion and three ribs extending outwardly therefrom, a first rib, a second rib and a third rib; each of the ribs projects upwardly from the bottom portion and extends from the central junction portion to the sidewall portion, wherein each of the ribs is substantially angularly joined to the bottom portion and the sidewall portion and wherein a first included angle between the first and second ribs differs from a second included angle between the second and third ribs and a third included angle between the first and third ribs differs from the first and second included angles. In general, the first and second included angles, in the aggregate, total more than about 200 degrees. More typically, the first included angle is from about 90 to about 110 degrees and the second included angle is from about 115 to about 135 degrees. The third included angle is typically from about 125 to about 145 degrees. In particularly preferred embodiments, each of the first, second and third ribs has a substantially flat top portion, which is angularly joined to a pair of upwardly projecting rib walls. The ratio of the diameter of the plate to the widths of the substantially flat top portions of the ribs is generally from about 25 to about 110, with from about 65 to about 90 being preferred.

In yet still another aspect of the present invention, there is provided a method of making a disposable, compartmented food service article by way of plug-assisted thermoforming comprising: positioning a softened plastic sheet to be formed in proximity to a thermoforming mold having a substantially planar mold surface and a plurality of rib portions projecting axially from the substantially planar mold surface, the rib portions defining a plurality of angular junctions with said substantially planar mold surface; and thermoforming the disposable compartmented food service container, wherein a plug-assist member is applied to said softened plastic sheet to urge said sheet toward conformity with the thermoforming mold, said plug-assist member comprising a plurality of rib relief portions positioned, configured and dimensioned to fit about the rib portions of the mold in a forming operation at a forming clearance distance of about 0.125 inches or less from the mold, the plug being provided with a plurality of substantially vertical wall rib relief portions configured and dimensioned to be substantially vertically aligned with the angular junctions of the rib portions of the mold with the substantially planar mold surface. The vertical wall portions are adjacent a plurality of angular corner portions transitioning between the vertical wall rib relief portions of said plug and a bottom surface of the plug. Typically, the plug-assist member is positioned, configured and dimensioned to fit about the rib portions of the mold at a forming clearance distance of about 0.075 inches or less; whereas, the substantially vertical wall rib relief portions of the plug-assist member are vertically aligned with the angular junctions of the rib portions of the mold with said substantially planar mold surface within a transverse distance of about 0.1 inch and preferably within a transverse distance of about 0.075 inches. Typically, the corner portions of the plug-assist member have a radius of curvature of from 0 to about 0.125 inches and commonly from 0.03 inches to about 0.09 inches. The substantially vertical wall rib relief portions of said plug-assist member are substantially vertically aligned with respect to said substantially planar surface mold surface within an angle of from about 70° to about 110° in most embodiments. Further aspects of the present invention will be appreciated from the appended drawings and following detailed description.

BRIEF DESCRIPTION OF DRAWINGS

FIG. 3 is a top plan view of the plate of FIG. 1;

FIG. 4 is a bottom plan view of the plate of FIG. 1;

DETAILED DESCRIPTION

Figure 1:
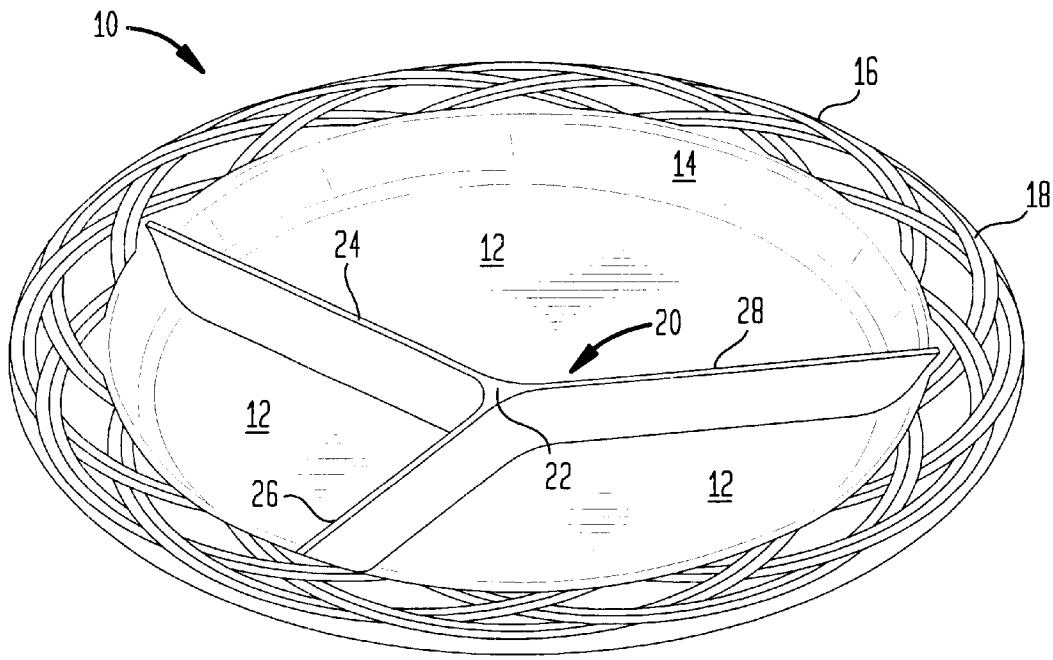
FIG. 1 is a view in perspective showing a disposable food serving plate fabricated in accordance with the invention.
Figure 2:
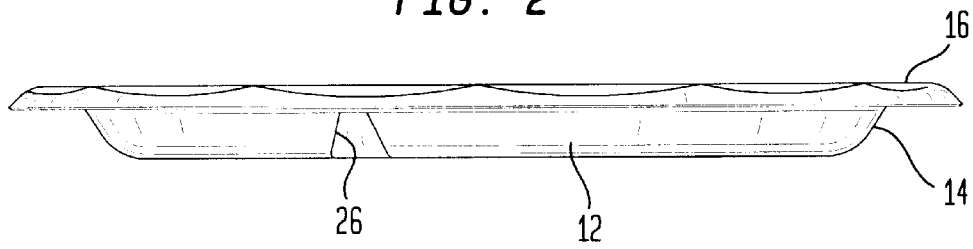
FIG. 2 is a view in elevation of the plate of FIG. 1.
Figure 5:
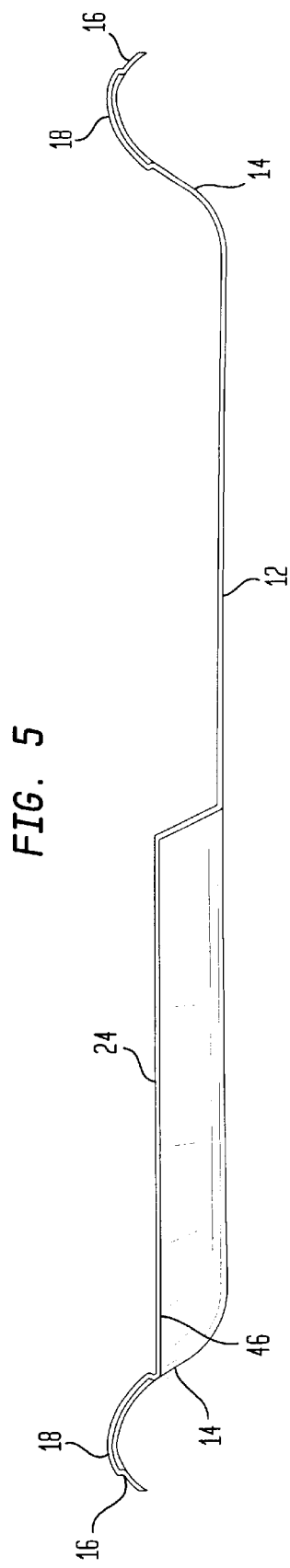
FIG. 5 is a view in elevation and section along line 5—5 of FIG. 3.

The invention is described below in connection with the various drawings. Such illustration is for exemplification only and is not limitative of the invention. The forming process for making plates of the present invention includes plug-assist thermoforming as is known. See U.S. Pat. No. 5,641,524 to Rush et al., the disclosure of which is incorporated herein by reference. So also, in order to make the sharp, angular junctions between the bottom of the inventive plate, for example, and the dividing ribs, it is preferable to fabricate a mold from multiple components so that the ribs are substantially angularly joined to the bottom and sidewall portion as can be seen from the appended Figures. The inventive method and apparatus are better understood in connection with a product such as the plate of FIGS. 1–7.

FIGS. 1–7 illustrate a disposable plate produced in accordance with the present invention. A plate 10 includes generally a substantially planar bottom portion 12 in three segments as well as a sidewall portion 14 and a flange portion 16 which may be provided with an embossed or a debossed pattern 18 as shown in FIGS. 1, 3, 4 and 5.

A divider portion 20 is integrally formed with the other portions 12, 14 and 16 of the plate as shown. Divider portion 20 has a central junction point 22 where a plurality of ribs 24, 26 and 28 converge. Ribs 24, 26 and 28 each define junctions with bottom portion 12 as shown in the drawings. Thus rib 24 is joined to the bottom at 30 and 32 which are essentially straight lines while ribs 26 and 28 are joined to the bottom portion at lines 34 and 36 and lines 38 and 40, respectively.

Figure 6:
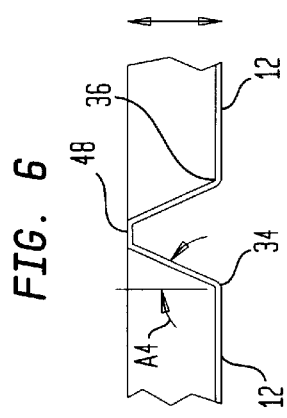
FIG. 6 is a view in elevation and section along line 6—6 of FIG. 3.

Each of the junctions 30 through 40 are substantially angular, that is, have substantially no radius of curvature or a very small radius of curvature as is better appreciated from FIG. 6 which is a view along line 6—6 of FIG. 3. Although there is usually some finite radius of curvature between the ribs and the other portions of the plate, the ratio of the diameter of the plate to the radius of curvature of the junction regions, such as regions 34 and 36 should be at least about 200, preferably at least about 350. The same parameters also apply to the other junctions of the ribs to the sidewalls and preferably to the transition of the rib walls to the flat top portion of the ribs as shown.

The ribs extend from junction point 22 to sidewall 14 where a plurality of substantially angular junctions such as junctions 42, 44 define the boundaries between the sidewall and rib. The height of the ribs may be configured to have a slight drop off at the sidewall in the region indicated at 46 on FIG. 6 if so desired in order to have a better fit with pattern 18. In the embodiment illustrated, which is an 11-inch diameter plate, the drop off is approximately 1/32 of an inch; while the ribs have an otherwise uniform height of approximately 0.6 inches.

There is further provided on each rib 24, 26, 28 a flat top, such as flat top 48 shown in FIG. 6. The flat top, which provides a truncated V-shape to the profile of the ribs, has a width of about 0.15 inches for an 11-inch diameter plate.

A salient feature of the inventive plate is the asymmetric arrangement of the ribs. In this regard, it should be noted that junction 22 is offset from the center of the plate at a distance (R') of about 0.70 inches for the 11-inch plate and the angles between the ribs are different. The center 22 of the rib junction is offset from the geometric center of the plate generally a distance R' along a radial line extending along the center axis of the rib 26. For the 11-inch plate illustrated, this distance is about 0.7 inches, as noted above, but may be from about 0.5 to about 0.9 inches for an 11-inch plate and may be scaled by way of the diameter of the plate for other sizes.

The angle between rib 24 and rib 26 is about 98 degrees as indicated by arc A1. Generally, this angle is between about 90 and 110 degrees while an angle A2 between rib 26 and 28 is about 127 degrees. Generally, angle A2 is from about 115 to about 135 degrees. Angle A1 and angle A2 total more than about 200 degrees in order to provide greater strength to the plate and reduced bucking tendency.

Still another angle A3 is defined between rib 28 and rib 24 to partition the largest compartment 50 of the plate.

The relatively severe, angular geometry of the rib portion is believed to contribute substantially to the rigidity of plate 10, much as a structural beam. In this connection it should be noted the ribs project upwardly at an angle A4 of about 30 degrees from a vertical line as can be seen in FIG. 6. Anywhere from about 20 to about 40 degrees form the vertical may be preferred in some embodiments.

The angular geometry of the rib portion is most preferably practiced with the relatively high modulus, mineral-filled polyolefin materials described hereinafter.

Figure 7:
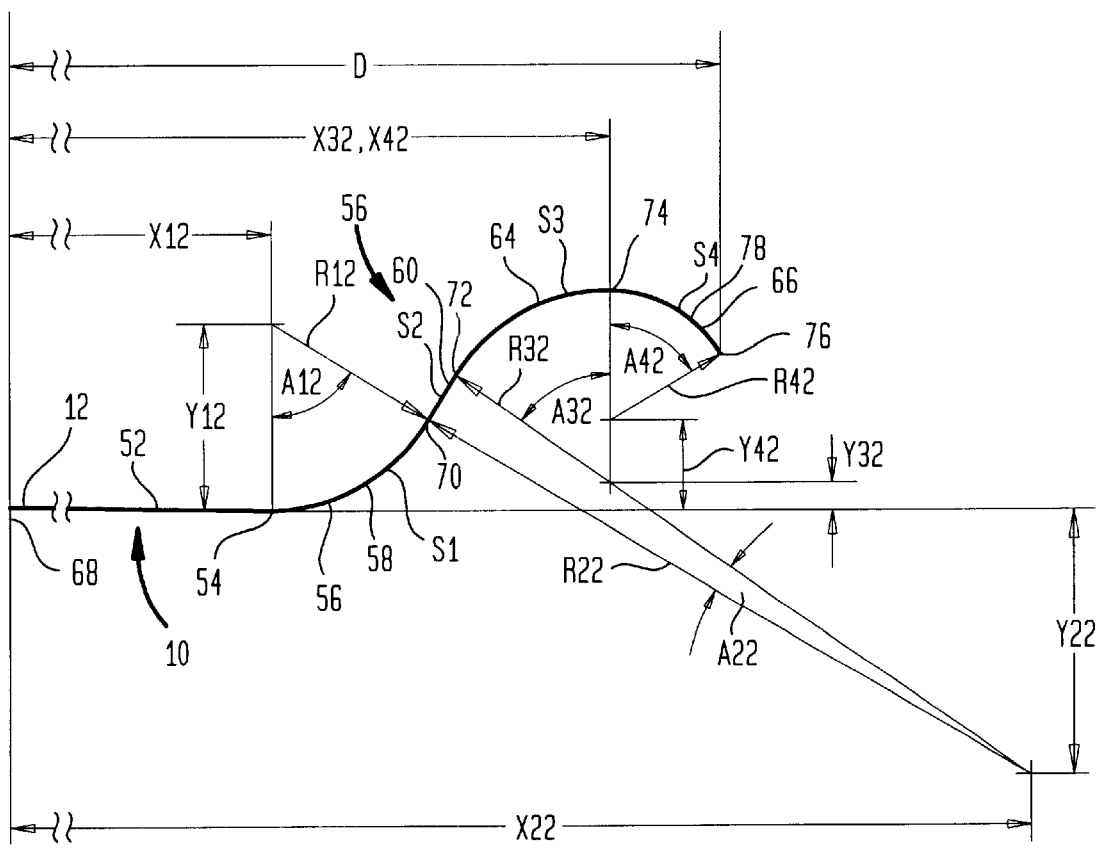
FIG. 7 is a schematic diagram illustrating the profile of the plate of FIG. 1 from the bottom to the outer flange.
Figure 8:
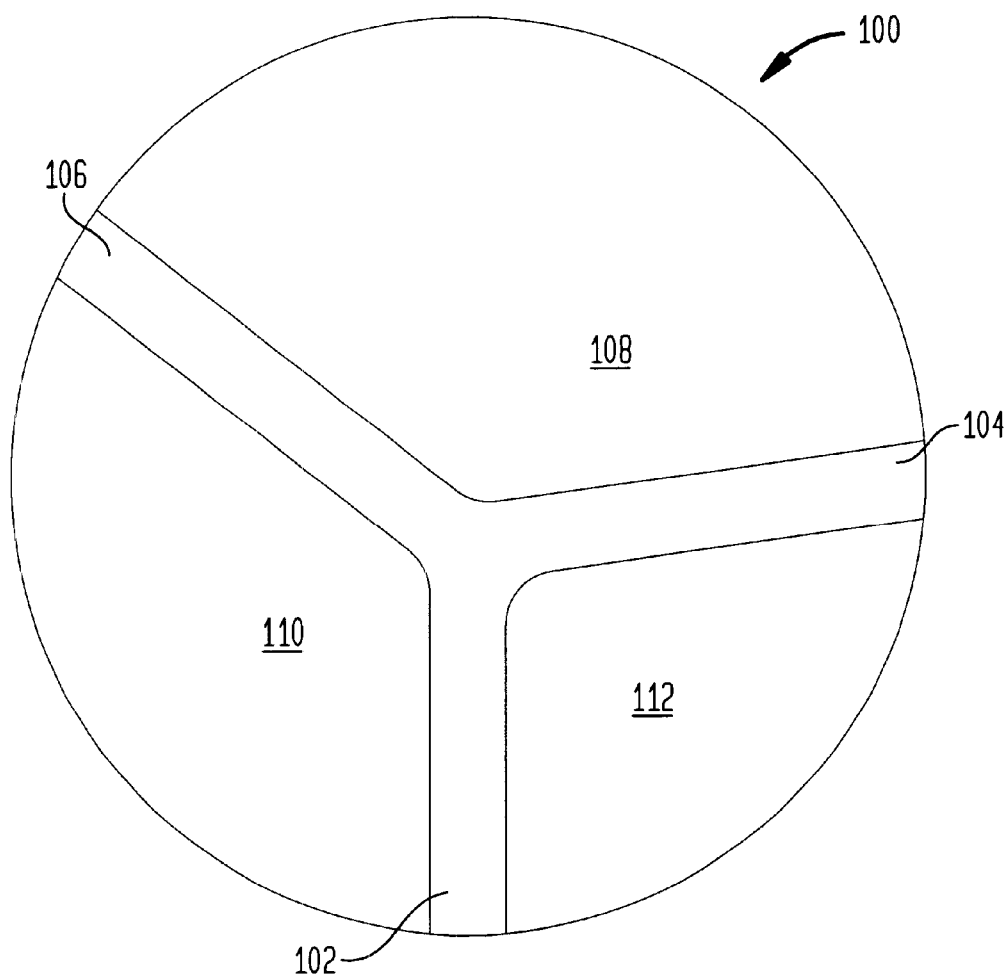
FIG. 8 is a plan view of a plug of the present invention useful for plug-assist thermoforming of a plate shown in FIGS. 1–7.
Figure 9:
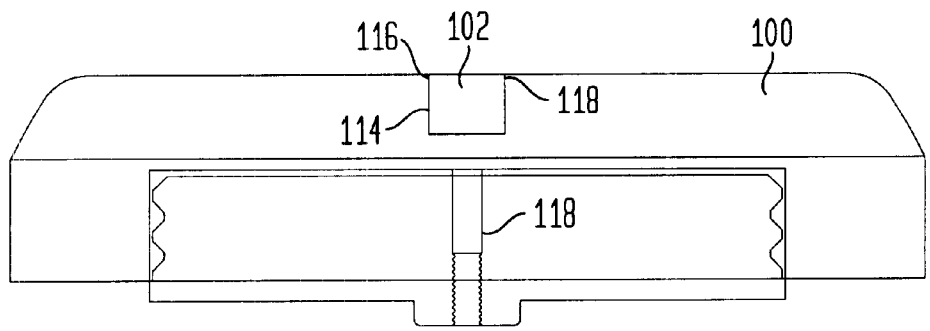
FIG. 9 is a view in elevation of the plug of FIG. 8 and further illustrating schematically a mechanical mount for the plug.

In contrast to the rib profile, the profile of the other portions of the plate, in general, is best kept smooth and flowing, without sharp corners. There is shown in FIG. 7 a schematic diagram illustrating the profile of the plate from bottom 12 through the flange. For purposes of convenience, the profile of the plate is diagrammed in an area where there is no rib.

Illustrated schematically in FIG. 7, there is a plate 10 which includes a planar center 52 which, in turn, includes an outer peripheral surface 54. This center region 52 is generally planar, forming a bottom for plate 10. An outwardly projecting sidewall 56 includes a first rim portion 58 which is joined to the outer peripheral surface 54 of the planar center 52. A second rim portion 60 is joined to the first rim portion 58. The first rim portion 58 and the second rim portion 60 form, in part, the outwardly projecting sidewall 56 which forms the sidewall of the plate 10. Plate 10 includes a third rim portion 64 which is joined to the second rim portion 60 of the outwardly projecting sidewall 56. A fourth rim portion 66 is joined to the third rim portion 64. The fourth rim portion 66 forms the outer edge of the plate 10. The plate 10 defines a center line 68. The base or bottom-forming portion 12 extends from the center line 68 to outer peripheral surface 54.

From the center line 68 a predetermined distance X12 extends toward the outer peripheral surface forming portion 54. A distance Y12 extends a predetermined distance from the base or bottom-forming portion 12 upwardly therefrom. A radius R12 extends from the intersection point of the distance X12 and Y12 to form first rim portion 58 of the outwardly projecting sidewall 56. The first rim portion 58 is defined by an arc A12 which extends from a substantially vertical line defined at the outer peripheral surface 54 to a fixed point 70. The arc A12 may be approximately 60°.

A distance X22 extends from the center line 68 to a predetermined point. A distance Y22 extends from the base or bottom-forming portion 12 of the plate 10 downwardly a predetermined distance. A radius R22 extends from the intersection of the lines X22 and Y22 to form a second rim portion 60 of the sidewall 56. The radius R22 extends from the first fixed point 70 to a second fixed point 72 through an arc A22. The arc A22 may be approximately 4°.

A distance X32 extends from the center line 68 to a predetermined distance. A distance Y32 extends from the base or bottom-forming section 12 of the plate 10 to project upwardly a predetermined distance. A radius R32 extends from the intersection of the lines X32 and Y32 to form the third rim portion 64. The radius R32 extends from the second fixed point 72 to a third fixed point 74. An arc A32 is formed between the second fixed point 72 and the third fixed point 74 to extend a predetermined distance. The arc A32 may be approximately 55°.

A distance X42 extends a predetermined distance from the center line 68. Similarly, a distance Y42 extends from the base or bottom-forming section 12 of the plate 10 to project upwardly. A radius R42 extends from the intersection of the lines X42 and Y42 to form a fourth rim portion 66 of the plate 10. An arc A42 is formed between the third fixed point 74 and a fourth fixed point 76 at diameter D from the center line. The arc A42 may be approximately 60°. A section 78 forms the outer edge of the plate.

In various embodiments of the present invention the container may be a 9 inch or 11 inch plate with profile coordinates as illustrated in FIG. 7 having the dimensions, angles, or relative dimensions enumerated in Tables 1 through 3. So also, plates of diameters other than 9 or 11 inches may have the relative dimensions in Table 3. So also, plates of diameters other than 9 or 11 inches may have the relative dimensions of Table 3 or may be configured with other relative dimensions. As will be appreciated, the various examples are illustrative only and variations within the spirit and scope of the present invention are readily apparent.

TABLE 1

Dimensions and Angles For 9" Plate

| DIMENSION and ANGLES | VALUE (inches or degrees) |
|---|---|
| R12 | 0.537 |
| X12 | 3.156 |
| Y12 | 0.537 |
| R22 | 2.057 |
| X22 | 5.402 |
| Y22 | 0.760 |
| R32 | 0.564 |
| X32 | 4.167 |
| Y32 | 0.079 |
| R42 | 0.385 |
| X42 | 4.167 |
| Y42 | 0.258 |
| A12 | 60.00° |
| A22 | 4.19° |
| A32 | 55.81° |
| A42 | 60.00° |
| D | 9.00 |

TABLE 2

Dimensions and Angles For 11" PLATE

| DIMENSION/ANGLES | VALUE (inches or degrees) |
|---|---|
| R12 | 0.656 |
| X12 | 3.857 |
| Y12 | 0.656 |
| R22 | 2.514 |
| X22 | 6.602 |
| Y22 | 0.929 |
| R32 | 0.689 |
| X32 | 5.093 |
| Y32 | 0.097 |
| R42 | 0.470 |
| X42 | 5.093 |
| Y42 | 0.315 |
| A12 | 60.00° |
| A22 | 4.19° |
| A32 | 55.81° |
| A42 | 60.00° |
| D | 11.00 |

TABLE 3

Dimensions For 9 and 11 INCH PLATE

| DIMENSION RATIO OR ANGLE | VALUES (Dimensionless or degrees) | | |
|---|---|---|---|
| | PREFERRED | MINIMUM | MAXIMUM |
| R12/D | 0.060 | 0.045 | 0.075 |
| X12/D | 0.351 | 0.280 | 0.420 |
| Y12/D | 0.060 | 0.045 | 0.075 |
| R22/D | 0.228 | 0.180 | 0.275 |
| X22/D | 0.600 | 0.480 | 0.720 |
| Y22/D | 0.084 | 0.065 | 0.100 |
| R32/D | 0.063 | 0.050 | 0.075 |
| X32/D | 0.463 | 0.370 | 0.555 |
| Y32/D | 0.009 | 0.007 | 0.011 |
| R42/D | 0.043 | 0.034 | 0.052 |
| X42/D | 0.463 | 0.370 | 0.555 |
| Y42/D | 0.029 | 0.023 | 0.035 |

TABLE 3-continued

Dimensions For 9 and 11 INCH PLATE

| DIMENSION RATIO OR ANGLE | VALUES (Dimensionless or degrees) | | |
|---|---|---|---|
| | PREFERRED | MINIMUM | MAXIMUM |
| A12 | 60.00° | 55.00° | 75.00° |
| A22 | 4.19° | 1.00° | 10.00° |
| A32 | 55.81° | 45.00° | 75.00° |

Salient features of the plate illustrated in FIGS. 1 through 7 generally include a substantially planar center portion with four adjacent rim portions extending outwardly therefrom, each rim portion defining a radius of curvature as set forth above and further noted below. The first rim portion extends outwardly from the planar center portion and is convex upwardly as shown. There is defined by the plate a first arc A12 with a first radius of curvature R12 wherein the arc has a length S1. A second rim portion is joined to the first rim portion and is downwardly convex, subtending a second arc A22, with a radius of curvature R22 and a length S2. A third, downwardly convex, rim portion is joined to the second rim portion and subtends an arc A32. There is defined a third radius of curvature R32 and a third arc length S3. A tangent to the third arc at the upper portion thereof is substantially parallel to the planer center portion as shown in FIG. 20. A fourth rim portion is joined to the third rim portion, which is also downwardly convex. The fourth rim portion subtends a fourth arc A42 with a length S4, with a radius of curvature R42.

The length of the second arc, S2 is generally less the length of the fourth arc S4, which, in turn, is less than the length S1 of the first arc A12. The radius of curvature R42 of the fourth arc is less than the radius of curvature R32 of the third rim portion, which in turn, is less than radius of curvature R22 of the second rim portion. The angle of the first arc, A12 is generally greater that about 55 degrees, while, the angle of the third arc, A32 is generally greater than about 45 degrees as is set forth in the foregoing tables. The angle of the fourth arc A42 is generally less than about 75 degrees and more preferably is about 60 degrees.

Typically, the length S1 of arc A12 is equivalent to the length S3 of arc A32 and R12 of the first rim portion is equivalent in length to the radius of curvature R32 of the third rim portion.

Generally speaking, the height of the center of curvature of the first arc (that is the origin of ray R12) above the central planar portion is substantially less than, perhaps twenty five percent or so less than, the distance that the center of curvature of the second rim portion (the origin of ray R22) is below the central planar portion. In other words, the length Y12 is about 0.75 times or less the length Y22.

So also, the horizontal displacement of the center of curvature of the second rim portion from the center of curvature of the first rim portion is at least about twice the length of the first radius of curvature R12. The height of the center of curvature of the third rim portion above the central planar portion is generally less than the height of the center of curvature of the fourth rim portion above the plane of the central planar portion. The horizontal displacement of the center of curvature of the second rim portion is generally outwardly disposed from the center of curvature of the third and fourth rim portions.

A further noteworthy feature of the plate of FIGS. 1 through 7 is that the height of the center of curvature of the third rim portion above the planar central portion is less than about 0.3 times the radius of curvature R42 of the fourth rim portion; while the height of the center of curvature of the fourth rim portion above the plane of the central portion is at least about 0.4 times the first radius of curvature R12. The plates are preferably made from mineral-filled polyolefin sheet such as polyethylene or polypropylene mineral-filled sheet as described in the appendix attached hereto.

As will be appreciated from the foregoing data tables as well as from the drawings and discussion above, the ratio of the fourth radius of curvature to the diameter of the plate is preferably at least about 0.03, while the ratio of the third radius of curvature to the diameter of the plate is preferably at least about 0.050. The ratio of the second radius of curvature to the diameter of the plate is preferably at least about 0.2 and the ratio of the length of the first radius of curvature to the diameter of the plate is preferably at least about 0.045.

Figure 10:
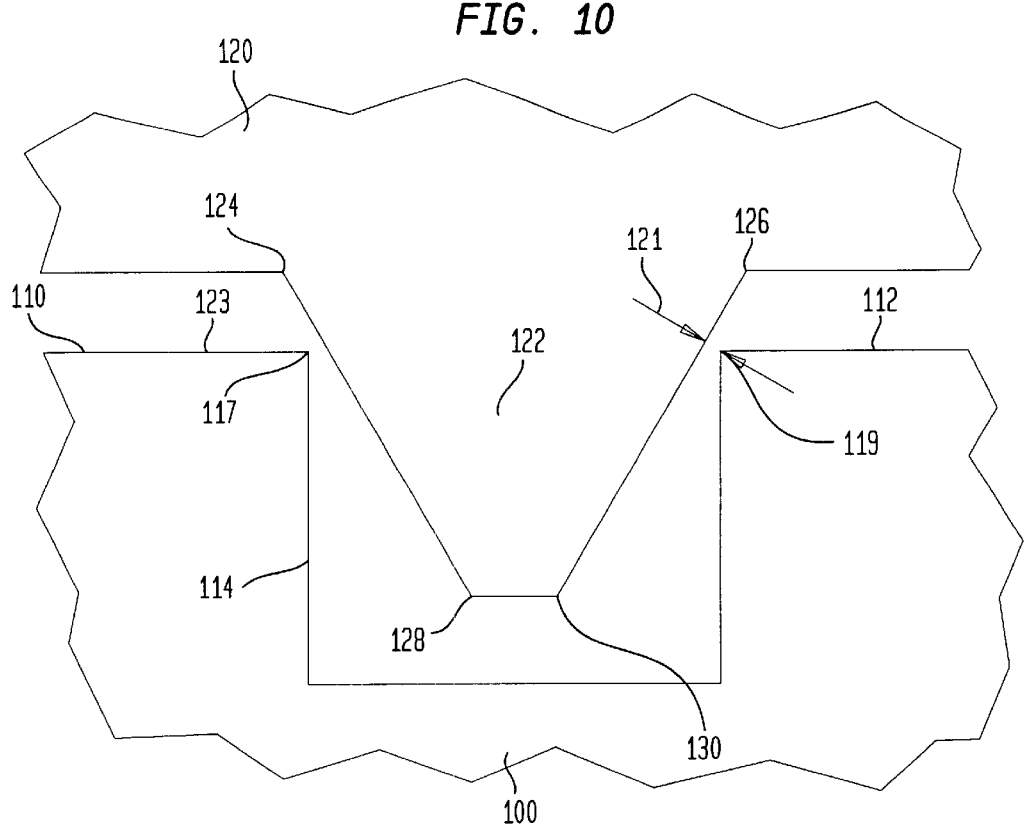
FIG. 10 is an illustration of a portion of the plug of FIG. 9 stroked toward a thermoforming mold.

There is shown in FIGS. 8 through 11 a plug 100 of the present invention useful for forming plates with sharp junctions such as those illustrated and discussed in connection with FIGS. 1 through 7. Plug 100 generally includes channels such as channels 102, 104, and 106. These channels are a relief offset of the mold ridge over which they assist the thermoforming operation of the plate to be formed. Also included is a plurality of substantially planar surfaces such as surface 108, 110, and 112 which may be hollow or concave if so desired inasmuch as they perform an important function during the thermoforming process, that is, the plug may be hollow so as not to contact or cool the heat softened plastic sheet, and thus to stretch the material towards the sharp junction between the thermoforming mold at the sharp rib junctions as will be appreciated from the discussion which follows hereinafter. It will be appreciated from FIG. 9 which is a view in elevation of the inventive plug 100 that the channels such as channel 102 are formed with near vertical sidewalls such as sidewall 114 and the plug has a sharp radius or very small radius at 116 such that the material is pushed or stretched directly towards the mold in close proximity as is illustrated in FIG. 10. It will be appreciated from FIG. 9 that the plug may be mounted by any conventional mechanical means such as by way of shafts, such as a shaft 118, so as to be reciprocally moveable with respect to the mold surfaces. Any type of thermoform may be employed whether vacuum, pressure, or vacuum/pressure assist in accordance with the present invention. For example, the mold may be placed upside down such that the ribs of the mold will project downwardly and the plug will push upwardly theretoward.

In FIG. 10 there is schematically shown in cross section a portion of a mold 120 which is disposed with a rib 122 of the mold pointing downwardly with respect to plug 100. Plastic to be formed is generally placed and perimeter clamped between mold 120 and plug 100 which have a forming clearance 121 at the end of the stroke of the plug with respect to mold 120. It is shown in FIG. 10 that mold 120, which is a portion of the mold used to form plates of the type shown in FIGS. 1 through 7, includes a rib 122 which has sharp angular junctions 124 and 126 which correspond to the sharp junctions in the plate as was discussed above. So also, rib 122 has sharp junctions at 128 and 130 which correspond to the upper portions of the rib of the plate as described above. It can further be seen from FIG. 10 that plug 100 and has sharp junctions at corners 117 and 119 in order to push or stretch the plastic material into proximity with the sharp junctions of mold 120. In this respect, it can be seen that the vertical sidewalls such as sidewall 114 are near vertically aligned with junctions 124 and 126 of mold 120.

Thus, a method of forming a compartmented food source article in accordance with the invention includes positioning a softened plastic sheet in close proximity to a mold, such as mold 120 provided with a substantially planar mold surface such as surface 123, which mirrors surface 110 of plug 100, with a plurality of rib portions such as rib 122 wherein the ribs form an angular junction, such as junctions 124, 126 between the rib and the planar mold surface. The junctions may, for example, have a radius of curvature of anywhere from 0 to about 0.125 inches in some embodiments. The plastic sheet is thermoformed wherein a plug-assist member, such as member 100 is applied to the sheet to urge the sheet toward conformity with mold 120. The plug strokes toward the mold to a minimum, or forming clearance such as clearance 121 shown in FIG. 10. Generally, the forming clearance is the distance between corners 117, 119 of the plug and the closest surface of the mold (which could be the rib or the substantially planar mold surface, or the junction thereof depending upon alignment) when the plug is at its maximum stroke, or minimum clearance, during the thermoforming process. It should be appreciated further from FIGS. 10 and 11 that corners 117, 119 transition between the substantially vertical sidewalls of the plug, such as sidewall 114 and the bottom surfaces 110, 112 of the plug. Corners 117, 119 typically are angular, but may have a radius of curvature of anywhere from 0 to about 0.125 inches in some embodiments.

Figure 11:
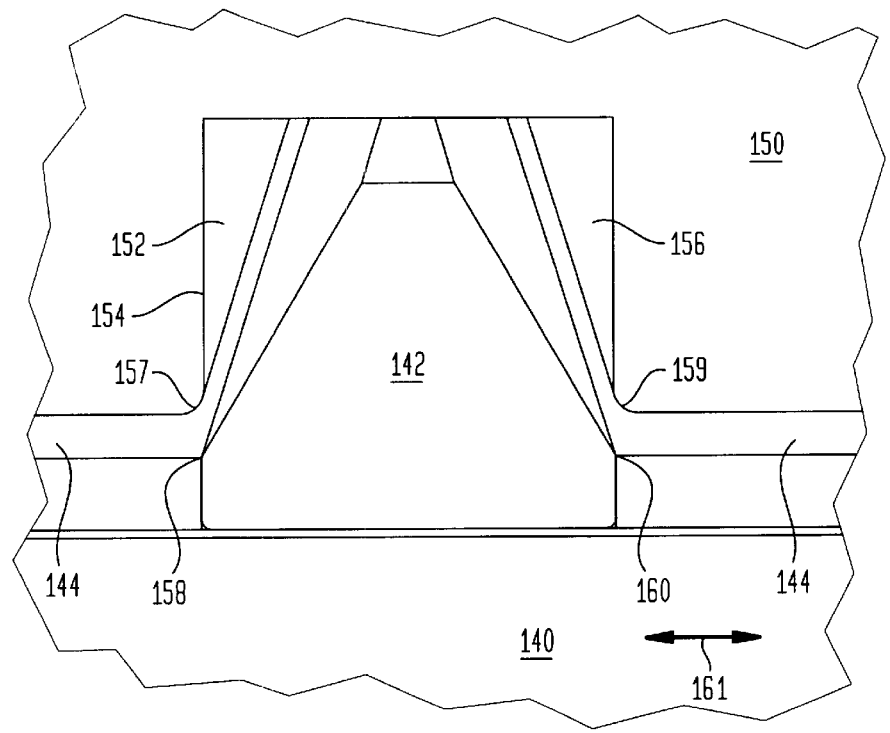
FIG. 11 is an enlarged isometric view of the apparatus of FIG. 10.

The invention is further appreciated by reference to FIG. 11. In FIG. 11, there is shown in isometric view a section of a mold 140 which has a plurality of rib segments 142 which correspond to the ribs of the plates illustrated in connection with FIGS. 1 through 7 above. Rib 142 of the mold is fabricated as a separate segment and generally includes the near sharp junctions 158, 160 described above in connection with the plates of FIGS. 1 through 7 and the molding process described in connection with FIGS. 8 through 10. Mold 140 also has a plurality of substantially planar surfaces 144 which correspond to the compartments of a compartmented food service container as will be appreciated by one of skill in the art. A plug 150 has a plurality of channels such as channel 152 provided with vertical side walls such as vertical side walls 154, and 156 which are vertically aligned with junctions 158 and 160 of the rib segments with the bottom forming portions of the mold. It can be seen from FIG. 11 that corners 157, 159 are vertically aligned with sharp junctions 158, 160 respectively of the mold; that is, the corners and junctions align on the same vertical lines from surface 144. The respective corners and junctions, while preferably vertically aligned may be offset slightly in a transverse direction 161 while still attaining the advantages of the present invention. Typically, the distance that corner 159 is offset in a direction 161 from junction 160 should not exceed about 0.1 inch and is preferably within about 0.05 inches. Likewise, walls 154, 156 are preferably vertical with respect to surface 144 of mold 140; however, the walls may form an angle of anywhere from about 70 to about 110 degrees with respect to surface 144 (direction 161) and preferably from an angle of from about 85 to about 95 degrees with respect to surface 144 (direction 161).

Figure 12:
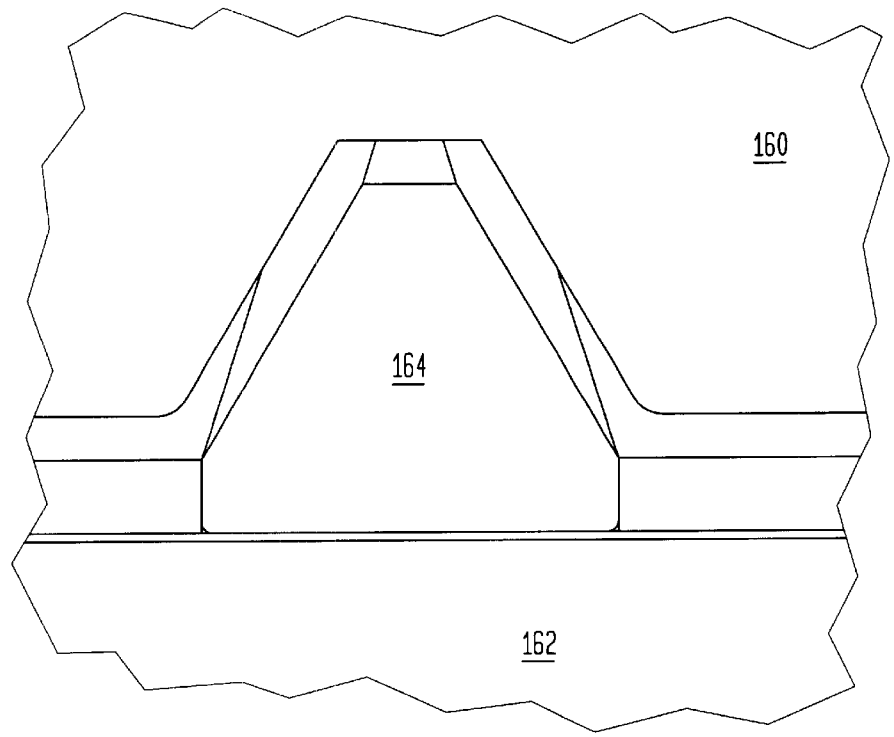
FIG. 12 is an isometric view of a portion of a plug for plug-assist thermoforming the plate of FIGS. 1–7 with an offset-style rib relief.
Figure 13:
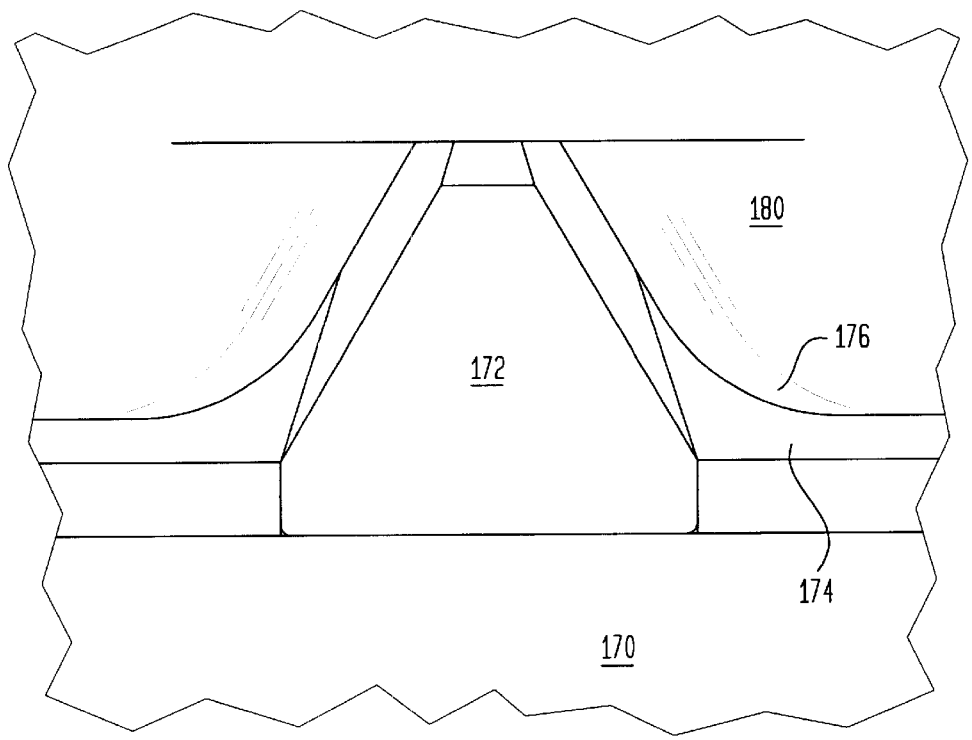
FIG. 13 is an isometric view of a portion of a plug for plug-assist thermoforming the plate of FIGS. 1–7 wherein the plug has a rib relief with large radii.

Other methods of thermoforming have been investigated and have found not to provide the consistent and superior properties of the molding apparatus illustrated in FIGS. 8 through 11. For example there is shown in FIG. 12 a plug 160 which has a profile which is an offset of mold 162. Mold 162 includes a plurality of rib segments such as rib 164 which are used to form the divider ribs, such as the divider ribs of the plates shown in FIGS. 1 through 7. This mold has been found to be inferior to the mold of the present invention when operated at a ⅛ inch clearance, perhaps due to the fact that the plastic sheet placed between the mold 162 and plug 160 contacts or cools against the plug resulting in poor distribution of material. Likewise, there is shown in FIG. 13 an alternate configuration of a molding apparatus which can be used for thermoforming containers such as those shown in FIGS. 1 through 7. FIG. 13 is a partial view in section of a mold 170 showing a rib 172 which can be used to form the ribs shown on the plates through FIGS. 1 through 7. This plug 180 has a far away offset rib relief with a relatively large radius of curvature at the corners and generally had a clearance of about ½ inch from the bottom 174 of the mold and the bottom 176 of the plug. Here again, the plug did not provide the advantages of the invention.

The invention has been described in detail in connection with numerous embodiments thereof, modifications to those embodiments within the spirit and scope of the invention which is set forth in the appended claims will be readily apparent to those of skill in the art.

What is claimed is:

1. A compartmented disposable food serving article having a substantially planar bottom portion and a plurality of rib portions configured so as to segment said article into a plurality of food serving compartments, wherein said rib portions are substantially angularly joined to said bottom portion and wherein said food serving article is thermoformed from a softened mica-filled polypropylene sheet utilizing a plug-assisted thermoforming process comprising:

(a) positioning said softened mica-filled polypropylene sheet to be formed in proximity to a thermoforming mold having a substantially planar mold surface and a plurality of rib portions projecting axially from said substantially planar mold surface, said rib portions defining a plurality of angular junctions with said substantially planar mold surface;

(b) thermoforming said disposable compartmented food service container, wherein a plug-assist member is applied to said softened mica-filled polypropylene sheet to urge said sheet toward conformity with said thermoforming mold, said plug-assist member comprising a plurality of rib relief portions positioned, configured and dimensioned to fit about said rib portions of said mold in a forming operation at a forming clearance distance of about 0.125 inches or less from said mold, said plug being provided with a plurality of substantially vertical wall rib relief portions configured and dimensioned to be substantially vertically aligned with said angular junctions of said rib portions of said mold with said substantially planar mold surface, said vertical wall portions being adjacent a plurality of angular corner portions transitioning between said vertical wall rib relief portions of said plug and a bottom surface of said plug.

2. The disposable food serving article according to claim 1, wherein said article has a wall thickness of from about 10 to about 80 mils.

3. The disposable food serving article according to claim 2, wherein said article has a wall thickness of from about 15 to about 25 mils.

4. The disposable food serving article according to claim 1, having a wall thickness from about 10 to about 80 mils consisting essentially of from about 40 to about 90 percent by weight of a polypropylene polymer, from about 10 to about 60 percent by weight of mica, from about 1 to about 15 percent by weight polyethylene, from about 0.1 to about 5 weight percent titanium dioxide and optionally including a basic organic or inorganic compound comprising the reaction product of an alkali metal or alkaline earth element with carbonates, phosphates, carboxylic acids as well as alkali metal and alkaline earth element oxides, hydroxides, or silicates and basic metal oxides, including mixtures of silicon dioxide with one or more of the following oxides: magnesium oxide, calcium oxide, barium oxide, and mixtures thereof.

5. The disposable food serving article according to claim 4, wherein said basic organic or inorganic compound comprises calcium carbonate and said calcium carbonate is present in an amount of from about 5 to about 20 weight percent.

6. The disposable food serving article according to claim 4, wherein polyethylene is present from about 2.5 to about 15 percent by weight.

7. The disposable food serving article according to claim 6, wherein polyethylene is present from about 4 to about 5 weight percent.

8. The disposable food serving article according to claim 4, wherein titanium dioxide is present from about 0.1 to about 3 weight percent.

9. The disposable food serving article according to claim 8, wherein titanium dioxide is present from about 0.25 to about 2 percent by weight.

10. The disposable food serving article according to claim 4, wherein titanium dioxide is present in an amount of at least about 0.5 percent by weight.

11. The disposable food serving article according to claim 4, wherein said article has a wall caliper of from about 10 to about 50 mils.

12. The disposable food serving article according to claim 11, wherein said article has a wall caliper of from about 15 to about 25 mils.

13. The disposable food serving plate according to claim 4, wherein said polypropylene polymer is isotactic polypropylene.

14. The disposable food serving article according to claim 13, wherein said isotactic polypropylene has a melt index of from about 0.3 to about 4.

15. The disposable food serving article according to claim 14, wherein said isotactic polypropylene has a melt flow index of about 1.5.

16. The disposable food serving plate according to claim 4, wherein said polyethylene is HDPE.

17. The disposable food serving plate according to claim 4, wherein said polyethylene is LLDPE.

18. The disposable food serving article according to claim 1, wherein said article is a disposable food serving plate comprising a substantially planar bottom portion, a sidewall portion extending about the periphery of said bottom portion and projecting upwardly therefrom, a flange portion extending outwardly from said sidewall portion and a divider portion configured so as to segment said plate into three compartments of differing volume, said divider portion having a central junction portion and three ribs extending outwardly therefrom, a first rib, a second rib and a third rib; each of said ribs projecting upwardly from said bottom portion and extending from said central junction portion to said sidewall portion, wherein each of said ribs is substantially angularly joined to said bottom portion and said sidewall portion and wherein a first included angle between said first and second ribs differs from a second included angle between said second and third ribs and a third included angle between said first and third ribs differs from said first and second included angles.

19. The disposable food serving plate according to claim 18, wherein said first and second included angles, in the aggregate, total more than about 200 degrees.

20. The disposable food serving plate according to claim 19, wherein said first included angle is from about 90 to about 110 degrees and said second included angle is from about 115 to about 135 degrees.

21. The disposable food serving plate according to claim 20, wherein said third included angle is from about 125 to about 145 degrees.

22. The disposable food serving plate according to claim 18, wherein each of said first, second and third ribs has a substantially flat top portion.

23. The disposable food serving plate according to claim 22, wherein said substantially flat top portion of said ribs is substantially angularly joined to a pair of upwardly projecting rib walls.

24. The disposable food serving plate according to claim 23, wherein the ratio of the diameter of the plate to the widths of said substantially flat top portions of said ribs is from about 25 to about 110.

25. The disposable food serving plate according to claim 24, wherein the ratio of the diameter of the plate to the widths of said substantially flat portions is from about 65 to about 90.

26. A method of making a disposable, compartmented food service article by way of plug-assisted thermoforming comprising:

(a) positioning a softened mica-filled polypropylene sheet to be formed in proximity to a thermoforming mold having a substantially planar mold surface and a plurality of rib portions projecting axially from said substantially planar mold surface, said rib portions defining a plurality of angular junctions with said substantially planar mold surface; and (b) thermoforming said disposable compartmented food service container, wherein a plug-assist member is applied to said softened mica-filled polypropylene sheet to urge said sheet toward conformity with said thermoforming mold, said plug-assist member comprising a plurality of rib relief portions positioned, configured and dimensioned to fit about said rib portions of said mold in a forming operation at a forming clearance distance of about 0.125 inches or less from said mold, said plug being provided with a plurality of substantially vertical wall rib relief portions configured and dimensioned to be substantially vertically aligned with said angular junctions of said rib portions of said mold with said substantially planar mold surface, said vertical wall portions being adjacent a plurality of angular corner portions transitioning between said vertical wall rib relief portions of said plug and a bottom surface of said plug.

27. The method according to claim 26, wherein said plug-assist member is positioned, configured and dimensioned to fit about said rib portions of said mold at a forming clearance distance of about 0.075 inches or less.

28. The method according to claim 7, wherein said substantially vertical wall rib relief portions of said plug-assist member are vertically aligned with said angular junctions of said rib portions of said mold with said substantially planar mold surface within a transverse distance of about 0.1 inch.

29. The method according to claim 28, wherein said substantially vertical wall rib relief portions of said plug-assist member are vertically aligned with said angular junctions of said rib portions of said mold with said substantially planar mold surface within a transverse distance about 0.075 inches.

30. The method according to claim 26, wherein said corner portions of said plug-assist member have a radius of curvature of from 0 to about 0.125 inches.

31. The method according to claim 30, wherein said corner portions of said plug-assist member has a radius of curvature of from 0.03 inches to about 0.09 inches.

32. The method according to claim 26, wherein said substantially vertical wall rib relief portions of said plug-assist member are substantially vertically aligned with respect to said substantially planar surface mold surface within an angle of from about 70° to about 110°.

33. A plug for plug-assisted thermoforming of a compartmented food service article from a softened mica-filled polypropylene sheet on a thermoforming mold having a plurality of rib portions which project axially from a substantially planar mold surface of said thermoforming mold, and which rib portions define a plurality of angular junctions with said substantially planar mold surface, said plug comprising a plurality of rib relief portions positioned and configured to fit about said rib portions of said mold in a forming operation at a forming clearance distance of about 0.125 inches or less from said mold, said plug being provided with a plurality of substantially vertical wall rib relief portions configured and dimensioned to be substantially vertically aligned with said angular junctions of said rib portions of said mold with said substantially planar mold surface, said vertical wall portions being adjacent a plurality of angular corner portions transitioning between said vertical wall rib relief portions of said plug and a bottom surface of said plug.

34. The plug according to claim 33, wherein said plug-assist member is positioned, configured and dimensioned to fit about said rib portions of said mold at a forming clearance distance of about 0.075 inches or less.

35. The plug according to claim 33, wherein said plug-assist member is substantially vertical wall rib relief portions of said plug-assist member are vertically aligned with said angular junctions of said rib portions of said mold with said substantially planar mold surface within a transverse distance of about 0.1 inch.

36. The plug according to claim 33, wherein said plug-assist member is substantially vertical wall rib relief portions of said plug-assist member are vertically aligned with said angular junctions of said rib portions of said mold with said substantially planar mold surface within a transverse distance of about 0.075 inches.

37. The plug according to claim 33, wherein said plug-assist has a radius of curvature of from 0 to about 0.125 inches.

38. The plug according to claim 33, wherein said plug-assist member has a radius of curvature of from 0.03 inches to about 0.09 inches.

39. The plug according to claim 33, wherein said plug-assist member are substantially vertically aligned with respect to said substantially planar surface mold surface within an angle of from about 70° to about 110°.

* * * * *